United States Patent [19]

Wallin

[11] 4,026,635

[45] May 31, 1977

[54] INDICATOR FOR DISPLAYING TEXT OR SYMBOLS ON SMALL SURFACES

[75] Inventor: Erland Olof Ingemar Wallin, Stockholm, Sweden

[73] Assignee: AB Teleplan, Solna, Sweden

[22] Filed: Oct. 7, 1975

[21] Appl. No.: 620,470

[30] Foreign Application Priority Data

Oct. 18, 1974 Sweden ............................ 7413182

[52] U.S. Cl. ............................ 350/112; 40/130 C; 350/96 R

[51] Int. Cl.² ............................ G02B 17/04

[58] Field of Search ................. 350/112, 96 R, 293; 40/130 C, 137; 340/380; 240/1 EL, 1

[56] References Cited

UNITED STATES PATENTS

| | | | |
|---|---|---|---|
| 894,509 | 7/1908 | Leupold | 40/130 C |
| 1,461,301 | 7/1923 | Wiskott | 350/293 |
| 1,732,068 | 10/1928 | Schauder | 40/130 C |
| 2,770,712 | 11/1956 | Dros | 240/1 EL |
| 3,406,475 | 10/1968 | O'Donnell | 240/1 EL |

*Primary Examiner*—John K. Corbin
*Assistant Examiner*—B. W. delos Reyes
*Attorney, Agent, or Firm*—Seidel, Gonda & Goldhammer

[57] ABSTRACT

Indicator for displaying text or symbols on small surfaces readable under very large reading angles from the normal of the displaying surface and during strongly incident light. The indicator comprises a light-impervious casing, at least one incandescent lamp, a transparency and a light conducting insert in the shape of a prism having an exit surface for the light from the incandescent lamp or lamps, said light entering the prism at the side surface or surfaces opposite to the exit surface in direct connection with which the transparency is provided.

5 Claims, 1 Drawing Figure

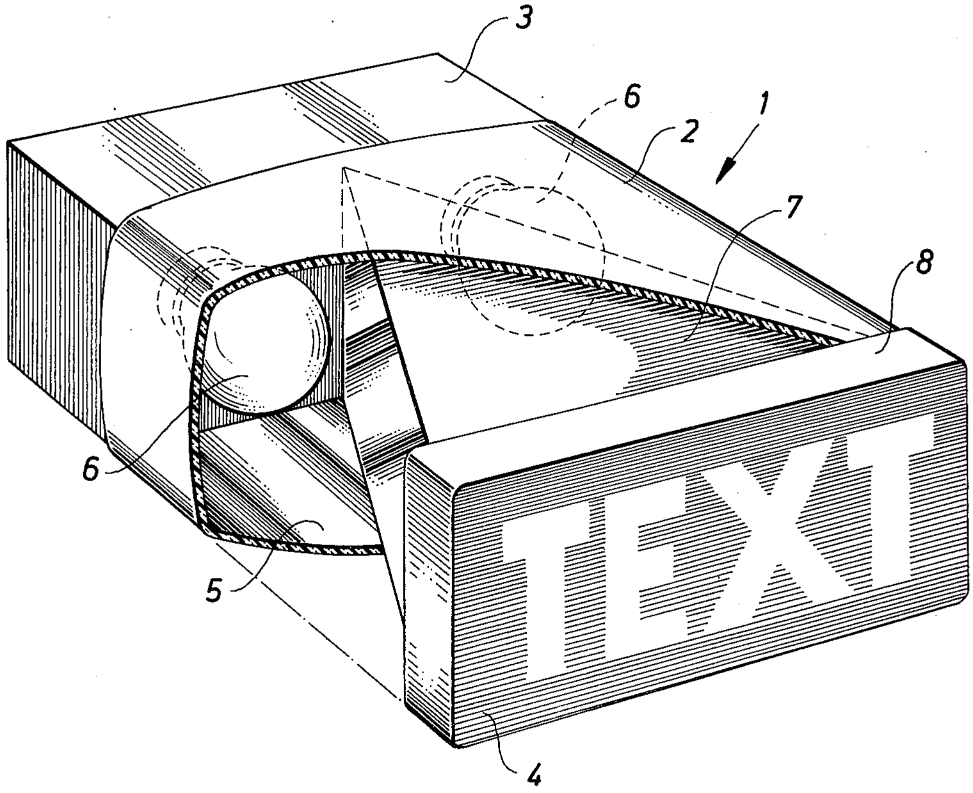
3
6
2
1
7
8
6
5
4
TEXT

INDICATOR FOR DISPLAYING TEXT OR SYMBOLS ON SMALL SURFACES

The present invention refers to an indicator for displaying text or symbols intended to be used either separately or in combination with push-buttons and during strongly incident light in which good reading is required also under very large reading angles from the normal of the displaying surface.

The present invention is primarily made for use in the pilot's cockpit in an aeroplane in which on the one hand the light conditions are difficult due to the incident light and, on the other hand, it may be difficult to place the indicator in a position within the direct range of vision of the pilot. The indicator in accordance with the invention can, of course, also be located in other places such as switch control rooms, on instrument panels for vehicles of practically any type and similar where a clearly readable text or symbol is to be presented against a dark, preferably black back-ground.

Prior indicators of this type have comprised lamps, diffusion filters, possibly colour filters, grey filters for increased contrast and a text in the form of a transparency. Much of the light from the lamps have then been lost in the diffusion filter and the grey filter and reflexes have appeared in the diffusion filter and in all filter transistions. Even if a circular polaroid is used as a grey filter reflexes are obtained in the diffusion filter. Moreover, the reflex damping is bad for oblique incident light and finally, the light collection is bad in particular in respect to oblique viewing angles.

Thus, the problem to be solved is to obtain a more brilliant display or image which can be viewed under oblique angles and where the risk or reflexes which seemingly might give the impression of an illumination of the image, i.e. the non-lighted display, has been reduced to a very high degree or practically eliminated.

Due to the heat development and the mechanical stresses on the incandescent lamp or lamps it is not possible to increase their effect beyond values now normal. Otherwise, this had been one of the simpliest ways to increase the intensity of the display i.e. the brightness level of the image or text in question.

For security reasons at least two incandescent lamps are used in indicators of the type here in question one of which should be sufficient to give the required brilliancy of the display. However, it should be possible to see whether one incandescent lamp is out of operation.

It would also appear possible to place the incandescent lamps adjacent the text but not only may in this case the transparency and any filters used be damaged by the heat development but the incandescent wires will show in an irritating way in the text and, in case one of the incandescent lamps is out of function, the light will be very unevenly distributed.

Attempts have also been made to improve the light transmission through the transparency or slide with the aid of cylinder lense systems and other complicated light conductors between the incandescent lamps and the transparency but in addition to considerable losses therein, these implements have been expensive to manufacture and mount. Moreover, they have yielded a very uneven light distrubution when one incandescent lamp has become disabled.

Thus, the problem is to cause the greatest possible part of the light emitted from the incandescent lamps to pass through the transparency with an even distribution over the entire surface thereof and with the greatest possible angle of dispersion. Simultaneously as little as possible of incident light should be reflected back to and through the transparency.

In the following the invention is described in detail with reference to the enclosed drawing showing an embodiment of an indicator according to the invention with some portions cut away.

The indicator shown on the drawing comprises a light-impervious casing 2 of substantially rectangular cross-section. At one end of the casing 2 there is an incandescent-lamp-holder 3 and at the opposite end the transparency 4 carrying the text or image to be displayed. The inner walls of the casing 2 between lamp-holder 3 and transparency 4 may be covered with a reflecting layer 5 or alternatively, a separate light reflector in the form of a thin plate or foil may be inserted into casing 2 supported by the inner walls thereof.

In the shown embodiment of the indicator in accordance with the invention two incandescent lamps 6 are provided in the lamp holder 3 from which they extend a distance into the interior of casing 2. Electric conductors, not shown, extend from the lamp-holder for supplying current to the incandenscent lamps 6. A major part of the interior of casing 2 is occupied by a light conducting insert in the form of a prism 7 having two plane-parallel limiting surfaces in the form of isosceles triangles. The side surface of the prism containing the base of the triangles is faced against the transparency 4 whereas the point is positioned substantially half-way between the two incandescent lamps 6 in such a way that the incandescent wires of the lamps are positioned slightly beyond the point.

When the lamps 6 are lighted their light will partly be reflected from the reflecting layer 5 towards prism 7 and partly be penetrating directly into the prism 7. The prism then serves as a light conductor and directs the radiation to the transparency and out through the transparent parts thereof.

A suitable material for the prism can be e.g. acrylic acid glass having an index of refraction of about 1.5 and which is an easily worked and durable material for this purpose. The light rays may then pass through the transparency 4 within the angle of total reflection, i.e. $\pm 42°$, which practically gives a coverage of substantially $\pm 90°$, in particular as the light source is not point-shaped but has a little extension.

Hence, the prism 7 has two inlets and one outlet. If one of the incandescent lamps 6 is out of operation the light at the transparency will be slightly weaker on the side of the transparency where the operating incandescent lamp is placed.

According to another embodiment of the indicator in accordance with the invention the insert is pyramide-shaped having the transparency positioned at the base with four lamps disposed symmetrically around the tip. The light distribution from the transparency under very oblique angles will then be considerable improved as the light in practically every direction will leave the transparency at approximately 90° with the same intensity. In addition, in such an embodiment incandescent lamps may be used supplied with lower effect that the rated effect, which means increased life.

However, in such an embodiment of the prism there will be smaller inlet surfaces for the light rays from the incandescent lamps due to which fact the double intensity of the emission from the transparency will not be obtained as in case with the embodiment previously described.

It is of course possible to use an insert of a different shape, for example as cones of circular or oval cross-section but, apart from the fact that these are slightly more difficult to manufacture than the previously mentioned embodiments, the ray paths will be such that the same yield will not be obtained as in prisms having square or rectangular cross-sections. On the other hand, a general diffusion of the light will be obtained which is better than for the prism previously mentioned.

Thus, the suitable prism according to the invention acts as a light conductor having at least two inlets and one outlet. The light is conveyed and retained in the light conductor by total reflection which means minimum losses. In a suitable prism manufactured of, for example, acrylic acid glass with N=1.49 the total reflection is about 42°. In order that an opposed inlet surface in this case should act as a mirror covering the complete outlet surface the tip angle of the prism will be $90° - 42° = 48°$. This is an optimum for exploiting the emitted light of the incandescent lamp while at the same time light rays coming from the outside cannot be reflected again in an outward direction. The value of the point angle is, however, not quite critical and can practically be varied about +20° and −10° giving satisfactory function of the indicator.

Thus, the prism according to the most suitable embodiment of the invention forms an insulation between the two incandescent lamps in such a way that two light inlets are obtained, the light from the two incandescent lamps being practically added in the prism. The consequense is that light which from the outside enters into the prism through the transparency will be subdivided whereby the risk of reflection additionally is reduced.

In order further to reduce the risk of reflection the lamp holder 3 forming the bottom of casing 2 is given a dull black colour.

An essential feature of the indicator in accordance with the invention is the transparency proper enabling the very oblique angles of radiation obtainable therewith to be utilized. The deficiences of filters are well known and have been mentioned above. In accordance with the present invention the shielded part of the display i.e. the parts of the base surface of the prism which are not to transmit light, shall be so thin that the exit angle of the light through the windows in the shape of letters, pictures or other presentation is not limited.

The holder 8 shown in FIG. 1 is not a measure of the thickness of the transparency but only forms a protection preventing the radiation to leave the indicator around the edge of the transparency, thereby to prevent scattered light.

The transparency to be displayed may be engraved directly as a relief in the exit surface of the prism, the areas between for example letters written in relief, being filled with a thin layer of light impermeable material. Alternatively the non-light transmitting portions may be printed on the exit surface of the prism. Possibly the entire transparency or display surface may be dulled for the purpose of eliminating reflexes.

What I claim is:

1. Indicator for displaying text or symbols within a maximum field of view and with maximal intensity and for reducing the reflection of light incident on the indicator to a minimum, comprising a light impervious casing, two light sources, a transparency carrying the text or symbols, and a light conducting insert in the casing, characterized in that the insert is a prism having two plane-parallel triangularly shaped limiting surfaces, one base surface which is positioned directly adjacent to the transparency, and two rectangular surfaces which are entrance surfaces for the light from the light sources, each light source being positioned adjacent to one of said light entrance surfaces, and that the light sources are mounted against a light absorbing background.

2. Indicator as claimed in claim 1, characterized in that the light conducting insert is surrounded by a reflective layer provided adjacent the inner wall of the casing between the incandescent lamps and the transparency.

3. Indicator as claimed in claim 1, characterized in that the prism is so shaped that the angle between the rectangular sides is substantially equal to the complementary angle of the total reflection angle of the material.

4. Indicator as claimed in claim 1, characterized in that the transparency comprises letters and symbols forming a relief in the exit surface of the prism, the intervening zones being occupied by light-absorbent material.

5. Indicator as claimed in claim 1, characterized in that the transparency is directly printed on the exit surface of the prism.

* * * * *